UNITED STATES PATENT OFFICE.

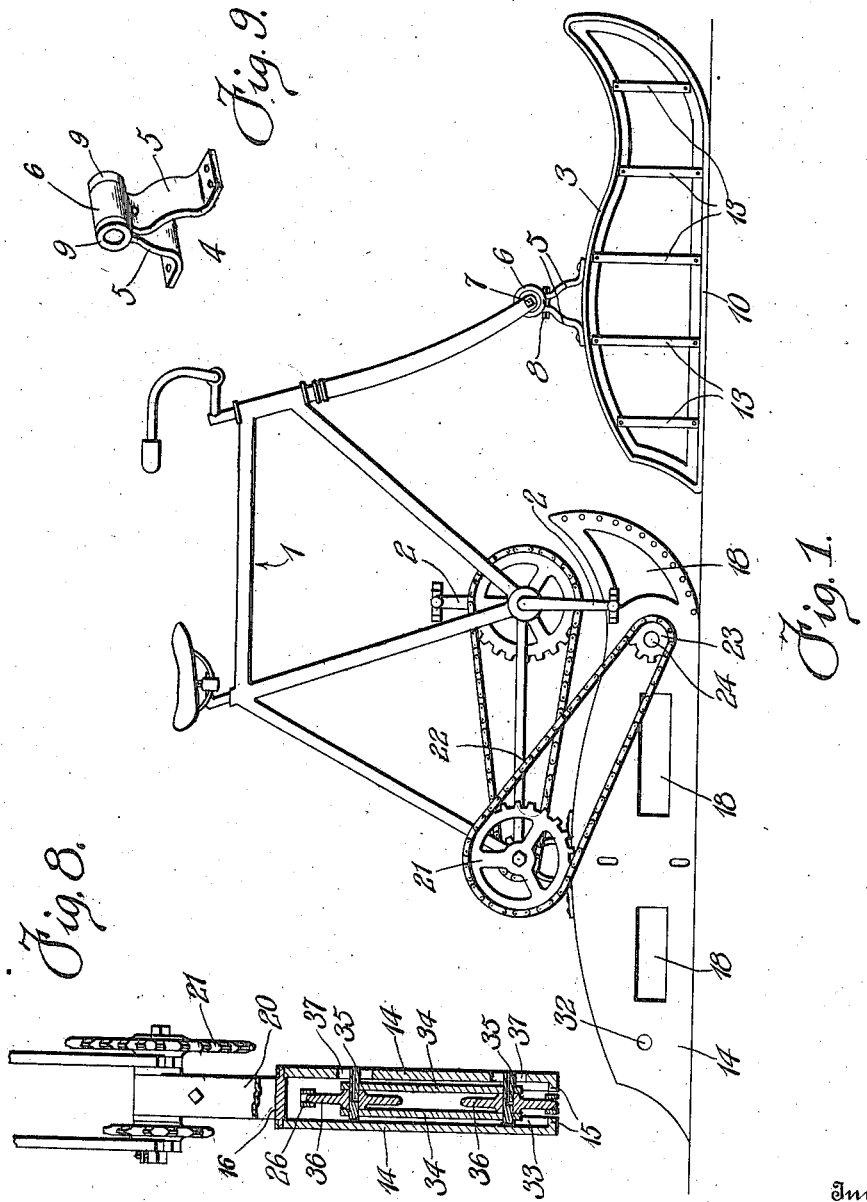

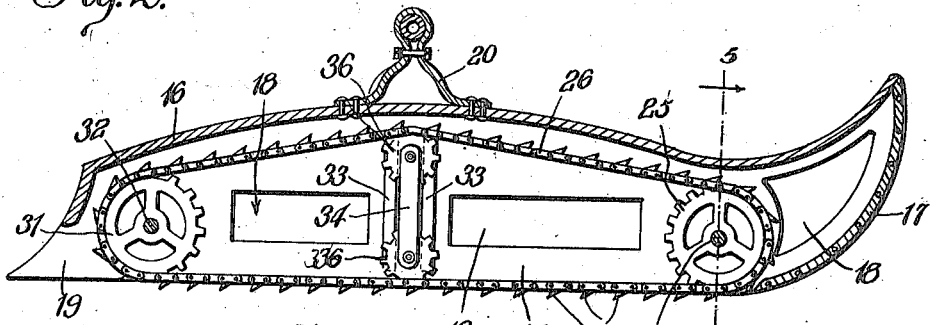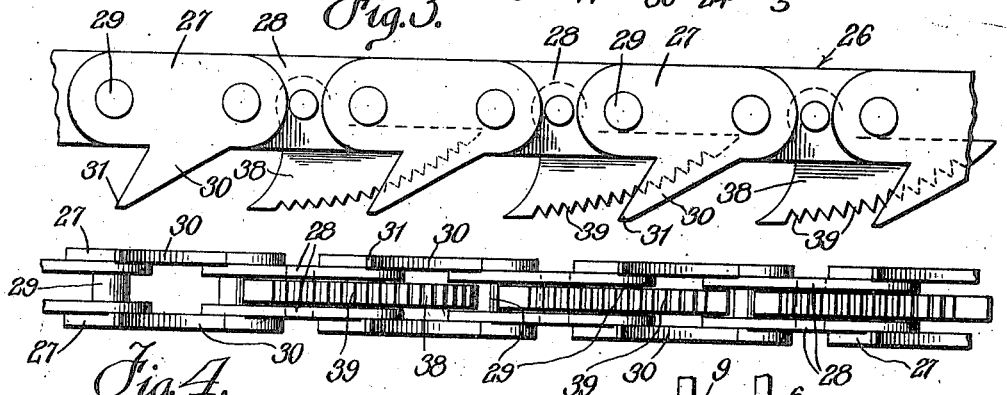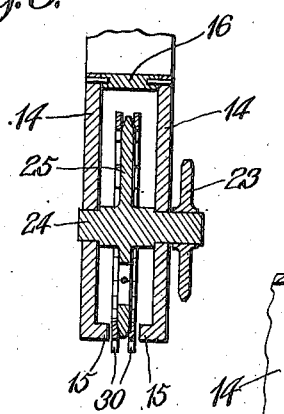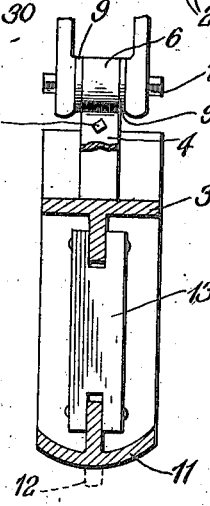

PER W. PALM, OF BAUDETTE, MINNESOTA.

SLED.

1,221,898.  Specification of Letters Patent.  Patented Apr. 10, 1917.

Application filed May 9, 1916. Serial No. 96,397.

*To all whom it may concern:*

Be it known that I, PER WILHELM PALM, a citizen of the United States, residing at Baudette, in the county of Beltrami and State of Minnesota, have invented certain new and useful Improvements in Sleds, of which the following is a specification.

This invention relates to sleds and its object, stated generally, is to provide a sled which may be propelled and steered in the same manner as a bicycle. Secondary objects of the invention are to provide novel propelling means and also to provide a novel construction and mounting for the runners.

The invention is illustrated in the accompanying drawings and resides in certain novel features which will be particularly pointed out in the claims following a detailed description.

In the drawings:

Figure 1 is a side elevation of a sled embodying my present improvements;

Fig. 2 is an enlarged longitudinal section of the rear runner;

Fig. 3 is a side elevation of a portion of the propelling element.

Fig. 4 is a bottom plan view of the same;

Fig. 5 is an enlarged section on the line 5—5 of Fig. 2;

Fig. 6 is an enlarged transverse section of the front runner;

Fig. 7 is a detail view of a portion of the rear runner;

Fig. 8 is a transverse section of the rear runner;

Fig. 9 is a detail perspective view of the bracket employed to mount the runner upon the frame.

The frame 1 may be an ordinary bicycle frame equipped with the usual pedals 2, or it may be equipped with a motor of a well-known type.

In carrying out my invention, the usual bicycle wheels are removed and runners are substituted therefor. The front runner consists of a suitably-shaped open frame 3 constructed of a metal bar T-shaped in cross section. To the upper member of this frame, I secure a bracket 4 which consists of upwardly converging legs 5 connected at their upper ends by a sleeve 6 which is adapted to fit within the front fork of the bicycle and be held therein by the usual axle or by a pivot pin or bolt, shown at 7. The lower ends of the legs 5 are rigidly secured to the upper member of the frame 3 and to prevent spreading of the bracket immediately below the axle or pivot pin, a transverse connecting bolt 8 may be inserted through the legs so as to bring the upper portions thereof close together below the axle or pivot pin and thereby prevent dropping of the front end of the frame. Spacing rings or washers 9 may be fitted between the ends of the sleeve 6 and the members of the front fork of the bicycle so as to maintain the central relation of the sleeve to the fork and overcome any possible tendency of the machine to sway unduly laterally. The lower member of the frame 3 is straight longitudinally, but its under surface is preferably convex transversely, as shown at 11 in Fig. 6, so that the bicycle may lean inwardly when turning to one side in the ordinary manner of steering. If necessary, the runner may be provided with a longitudinal rib, indicated at 12 in dotted lines, to prevent skidding, but this rib is not essential and may generally be dispensed with. To prevent collapse of the runner, I provide at intervals throughout its length, standards or connecting bars 13 which have their upper and lower ends bifurcated and secured respectively to the longitudinal ribs or stems of the upper and lower portions of the frame, as shown clearly in Fig. 6. This construction of the runner attains requisite strength to prevent collapse of the runner notwithstanding hard usage and, at the same time, effects economy in construction by minimizing the material necessary and also reduces the weight so that the runner will readily glide over snow or ice.

The rear runner is hollow so as to form a housing for the propelling element and is constructed of side plates 14 having inwardly extending flanges 15 at their lower ends and having their upper ends secured to and connected by a spacing block or plate 16 which extends approximately the full length of the runner. A similar spacing block 17 is secured between the front ends of the side plates and extends to the lower edges of the same so as to close the front end of the runner and enable it to glide readily over snow and ice. This spacing block or plate also prevents the entrance of snow or ice between the front ends of the plate and, consequently, prevents the choking of the driving mechanism. The side plates may be provided with openings 18 to reduce the weight and the space between the rear extremities of the side plates is left open, as indicated at 19, so that any snow which might tend to accumulate within the runner, at the rear end of the same, will be permitted to escape. The rear runner is mounted upon the rear axle of the bicycle frame by a bracket 20, corresponding in all respects to the bracket 4 by which the front runner is mounted upon the front axle, and it will be readily noted that this mounting provides a strong support for the frame upon the runners and at the same time permits the runners to oscillate about the respective axles so that they may readily glide over an uneven surface without impeding the progress of the sled or increasing the strain upon the driving mechanism.

In applying the runners to the bicycle frame, an additional sprocket wheel 21 is secured to the back axle and this sprocket wheel is connected through a sprocket chain 22 with a pinion 23 secured upon a shaft or axle 24 which is journaled in the side plates 14 near the front ends of the same, and carries upon its inner portion, between the said plates, a sprocket wheel 25. This sprocket wheel 25 imparts motion to the driving element which, in the present instance, is an endless chain provided at intervals with ground-engaging teeth or lugs. The chain is designated 26 and consists of spaced links 27 and 28 which are pivotally connected and are so disposed that alternate links fit around and between the teeth of the sprocket wheel. The links 27 are spaced apart a greater distance than the links 28 so that the ends of the links 28 fit between the ends of adjacent links 27 and also bear upon the periphery of the sprocket wheel between adjacent sprocket teeth, while the links 27 bear upon the periphery of the sprocket wheel at the sides of the sprocket teeth and the pins 29, by which the meeting ends of the links are pivotally connected, engage the teeth of the sprocket wheels and thereby impart motion to the said wheels. On the lower or outer edge of each link 27 is formed a ground-engaging tooth or lug 30 which has its forward edge inclined so as to readily ride over the surface of the snow or ice, while its rear edge is more abrupt and meets the forward edge in a point 31 which is adapted to take into the snow or ice and thereby drive the sled forward. While I prefer to provide each link 27 with a ground-engaging tooth, it is obvious of course, that alternate links only may be so constructed, or even a less number of teeth may sometimes be found sufficient. The chain 26 is disposed longitudinally within the rear runner and the rear bight of the same passes around a sprocket wheel 31, similar to the sprocket wheel 25, the shaft of the wheel 31, however, not extending beyond either side plate 14. The lower run of the driving chain plays in the space between the flanges 15 of the side plates of the runner and its teeth 30 project below the said flanges a sufficient distance to firmly engage the surface over which the sled is traveling.

On the inner face of each side plate 14, adjacent and spaced equidistant from the longitudinal center thereof, I secure cleats or guides 33 between which are slidably mounted hangers or links 34. These hangers or links 34 have openings in their upper and lower ends to receive the axles or shafts 35 of the sprocket wheels 36 which engage the opposed inner faces of the upper and lower runs of the chain 26, the ends of the said shafts or axles 35 playing in the vertical slots 37 in one of the side plates between the cleats or guides 33, as will be readily understood. When motion is imparted to the sprocket wheel 25 to drive the sled forward, the strain upon the chain is received by the upper run thereof so that the said run tends to straighten and this action will force the tension members, consisting of the links or hangers 34 and the idler sprockets carried thereby, downward so that the lower run of the chain will be forced to and move in engagement with the ground. It will be readily understood that this action tends to carry the intermediate or central portion of the lower run of the chain below the ends of the said run and, as a result, the chain will present a central point about which the runner may readily rock both horizontally and vertically and thereby facilitate the turning of the sled to either side, and the sprocket wheels 25 and 31 are of such diameter and so disposed that the lower run of the chain will engage the ground through practically its entire length so that an extended engaging and working surface is provided and the labor of propelling the sled is minimized.

If the sled is on a down grade, the rider may coast, as upon an ordinary sled, by merely shutting off the motor or holding the pedals stationary. In order that such coasting may not be too rapid and that the travel of the sled may be entirely arrested if necessary, I provide braking members or dogs 38 which are pivoted between each pair of the links 28 and have eccentric serrated forward edges 39. These dogs 38 will extend forwardly between the preceding teeth 30 and, when the chain is being operated to drive the sled, the rear ends of these dogs will take into the ground in exactly the same manner that the points of the teeth 30 take into the ground. Should the chain be held at rest, however, or the rider should back pedal, the engagement of the ground with the serrated edge of the dog will cause it to swing downwardly and the increasing radius of said edge toward the front end thereof, will cause it to take into the ground so as to check the progress of the sled. The position of the dogs relative to the preceding teeth is clearly illustrated in Fig. 3 of the drawings.

From the foregoing description, taken in connection with the accompanying drawings, it is thought the manner of using my improved sled will be readily understood. The rider mounts the sled in exactly the same manner as a bicycle is mounted and operates the pedals just as though it were an ordinary bicycle. The lower run of the propelling element will travel rearwardly with respect to the runner in which it is housed and will, consequently, take into the ground and exert a leverage upon the runner which will cause the same to move easily and rapidly forward. Should snow be taken up by the chain, the open formation of the links thereof will permit the ready discharge of such snow and this discharge will be effected by engagement of the chain with the several sprockets. The idler members will effectually and positively hold the driving element in engagement with the snow or ice and the more rapidly the machine is traveling, the more effectual will be the engagement. The mechanism is light enough to be easily handled by one person and yet will possess sufficient weight to hold it steady during travel and enable it to withstand severe shocks and rough usage.

The shafts 35 will, preferably, be fixed and the idlers 36 run free thereon. Receptacles for lubricant may, consequently, be formed in the shafts or axles as indicated in Fig. 8, the lubricant being fed into the receptacles through the slots 37 and the ends of the receptacles being then closed by any convenient means.

Having thus described the invention, what is claimed as new is:

1. In a bicycle sled, a runner consisting of side plates provided with longitudinal flanges on their opposed faces at their lower edges, spacing elements secured to and between the said side plates and extending along the upper edges and the front ends thereof and curved rearwardly to merge into the lower edges of the same, a propelling element disposed longitudinally of the runner between the said longitudinal flanges, and means for imparting motion to said propelling element.

2. In a bicycle sled, the combination of a runner, a driving element housed therein, and means for imparting motion to said driving element, said driving element consisting of pairs of links, some of said links being provided with ground-engaging teeth, and some of said links being provided with pivoted eccentric ground-engaging dogs, the links carrying the dogs having their ends disposed between and pivoted to the ends of the pairs of links provided with teeth.

3. In a bicycle sled, the combination of a runner consisting of side plates and spacing blocks secured to and extending between the said side plates at the front ends thereof and along the upper edges of the same, cleats disposed on the inner faces of the side plates at about the center of the same, vertical slots being formed in the side plates between the cleats, gear wheels mounted between the side plates at the front and rear ends thereof, hangers slidably fitted between said cleats, idlers carried by the upper and lower ends of the said hangers and having shafts playing in the slots in the side plates, an endless driving chain passing around the said gear wheels and engaged by said idlers, and means for imparting motion to one of said gear wheels.

In testimony whereof I affix my signature.

PER W. PALM. [L. S.]

Copies of this patent may be obtained for five cents each, by addressing the "Commissioner of Patents, Washington, D. C."